United States Patent

Wershe

[11] Patent Number: 5,689,884
[45] Date of Patent: Nov. 25, 1997

[54] CIRCULAR SAW WITH BLOWER

[76] Inventor: Richard Wershe, 31958 Nardelli, Roseville, Mich. 48066

[21] Appl. No.: 636,796

[22] Filed: Apr. 22, 1996

Related U.S. Application Data

[63] Continuation-in-part of Ser. No. 342,860, Nov. 21, 1994, Pat. No. 5,539,985.

[51] Int. Cl.$^6$ ........................................................ B25F 3/00
[52] U.S. Cl. ........................................ 30/123.3; 30/390
[58] Field of Search ................................. 30/123.3, 124, 30/123, 390, 514, 516; 83/98, 168

[56] References Cited

U.S. PATENT DOCUMENTS 5,084,971  2/1992  Remington et al. ................ 30/123.3
5,199,174  4/1993  Wild ..................................... 30/123.3
5,539,985  7/1996  Wershe ................................ 30/123.3

*Primary Examiner*—Hwei-Siu Payer
*Attorney, Agent, or Firm*—Reising, Ethington, Barnard and Perry

[57] ABSTRACT

A circular saw (14) has a blower conduit (76) for producing a sufficiently strong air current directly in front of the circular saw blade (18) to blow away saw dust from about the lead guide (34) that is aligned directly in front of the saw blade. The lead guide is mounted at the front edge of the foot (30). The conduit (76) is attached to a funnel section (70) that receives air from blower fan (28). The conduit 76 is self supporting and extends from the funnel section (70) and has a free standing distal end (67) that can be adjustably pointed to the lead guide (34) to allow passage of air flow from the exhaust vents to the lead guide.

4 Claims, 1 Drawing Sheet

CIRCULAR SAW WITH BLOWER

This application is a continuation-in-part of U.S. Ser. No. 342,860 filed on Nov. 21, 1994 (now U.S. Pat. No. 5,539,985).

TECHNICAL FIELD

The field of this invention relates to power circular saws and more particularly to a circular saw having a blower that blows the saw dust away from the lead guide at the front portion of the saw foot.

BACKGROUND OF THE DISCLOSURE

Circular saws, particularly portable direct drive circular saws, have seen great commercial success because of their adaptability, reliability, power, convenience, and safety in cutting plywood, paneling or other flat surfaced woods.

Most direct drive circular saws have a blade guard housing and a pivotally mounted lower blade guard housing. The saw blade is mounted on an motor driven arbor. The motor is mounted within a motor housing adjacent the upper guard housing. The motor operably drives a cooling fan. A motor housing about the motor and fan has an inlet an exhaust vent for directing cooling air through the motor housing and about the motor. A foot having an opening therethrough is mounted about the circular saw blade for providing a platform on which the circular saw rests on the wood that is being cut.

The foot has a front lead guide for providing a visual alignment guide for indicating the linear alignment where the circular saw will cut into the wood. Many operators use this lead guide solely or in conjunction with the position of the saw blade to determine the alignment of the saw and properly guide the saw blade through the wood.

A common problem with circular saws is the fact that after a sufficient amount of saw dust is created by the cutting action of the saw blade, the saw dust often obscures the lead guide. An operator of the circular saw finds that he repeatedly either stops the saw to wipe away the saw dust or backs the saw off momentarily while he puckers his lips and manually blows the dust off. Either procedure wastes time and lowers the efficiency of the circular saw operation.

To date, circular saws have been developed and built without effective and economical blowers that clear most of the saw dust away from the aligned cutting path and maintain a visually clear path for the operator. Previous built-in systems use suction and mount a bag to collect the saw dust. The mount and bag add expense and while it collects much saw dust, it does not specifically address the problem of saw dust collecting upon and obscuring the lead guide.

The only known blowers use a complex flexible rubber conduit assembly that needs to be bracketed and clamped at its outlet end to maintain its appropriate position. See U.S. Pat. No. 5,084,971 to Remington et al. The rubber conduits and extra wire brackets make it inconvenient to use. Furthermore, many saws do not have threaded apertures about its exhaust vent that allows a plenum to be mounted thereto. As such, many people continue to blow the saw dust away with their breath.

What is needed is an economically feasible circular saw that has its housing incorporating a nozzle that allows a self supporting conduit to be attached that allows air to pass therethrough and continuously blows the saw dust off the visual lead guide of a direct drive circular saw thereby eliminating the need for the operator to stop and clear the lead guide by wiping it or blowing air from his mouth.

SUMMARY OF THE DISCLOSURE

In accordance with one aspect of the invention, a direct drive circular saw includes an upper blade guard housing and a lower blade guard housing pivotally mounted to said upper blade guard housing. A platform having an opening therethrough is mounted about the circular saw blade for providing a mount on which the circular saw rests itself onto the wood that is being cut. The platform has a lead guide in front of the blade guard housing for providing a visual alignment guide for indicating where the circular saw will cut the piece of wood.

The saw blade is mounted on a motor driven arbor. The motor is mounted within a motor housing adjacent the upper guard housing. The motor is operably mounted to a cooling fan that directs air in from an inlet, about the motor, and out through an exhaust vent in the motor housing. The vent is operably connected to a conduit that directs air from the exhaust vent to the lead guide member for blowing saw dust away from said lead guide member when said motor is operating the saw blade through wood.

In one embodiment the conduit includes a self supporting flexible pipe that is adjustable and has a free standing distal outlet end that is adjustably pointed toward the lead guide member. Preferably, the conduit is connected via a nozzle to a funnel section that is integrally formed with the motor housing. However, the funnel section may be a section of the motor housing that is affixed by bolts, welds, or other fasteners. The nozzle mounted to the funnel section operably leads to an outlet end of the conduit that is free standing and directs air to the lead guide for blowing saw dust away from the lead guide when the circular saw is operating and cutting wood.

The flexible conduit is adjustable in a plurality of fixed positions and has its free standing outlet adjustably pointed toward the lead guide member. The flexible pipe is free standing from its inlet end that is mounted to the nozzle at the funnel section.

In one embodiment, the funnel section has extra exhaust vents to assure adequate air flow about the motor housing. The exhaust vents are sized to still provide adequate air flow through the nozzle but assures air flow in the event that the conduit becomes clogged.

In accordance with a broader aspect of the invention, a blower attachment for directing a sufficiently strong air current in front of the circular saw blade is attached to the direct drive circular saw through a single mounting fastener. In accordance with another aspect of the invention, a guard stop of a circular saw includes a protrusion and mounting means therein for mounting duct work of a blower attachment for a circular saw.

BRIEF DESCRIPTION OF THE DRAWINGS

Reference now is made to the accompanying drawings in which.

DETAILED DESCRIPTION OF THE PREFERRED EMBODIMENT

Figure 1:
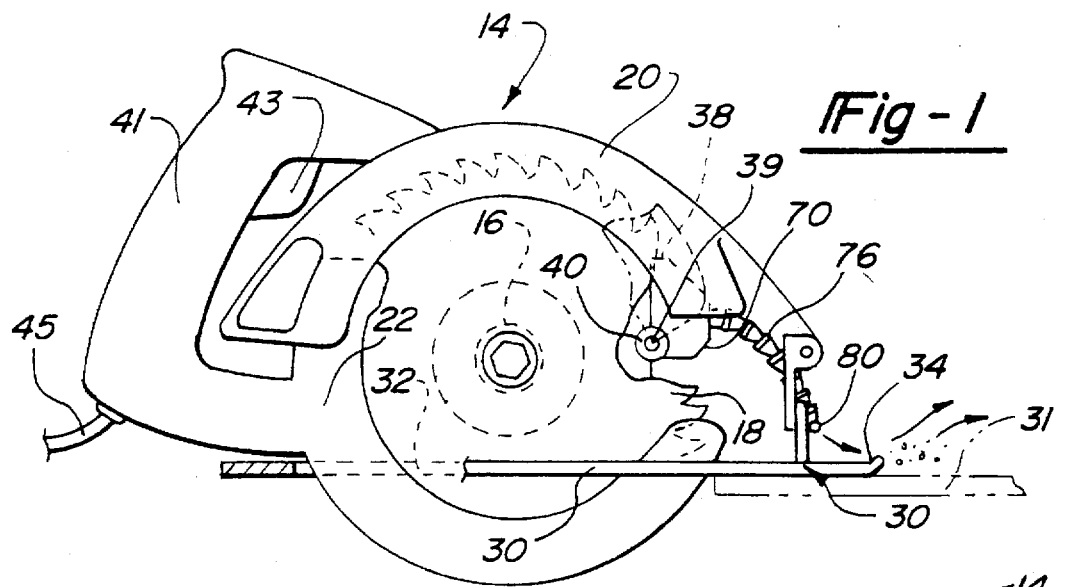
FIG. 1 is a front elevational view of a direct drive power circular saw illustrating an embodiment according of the invention.
Figure 2:
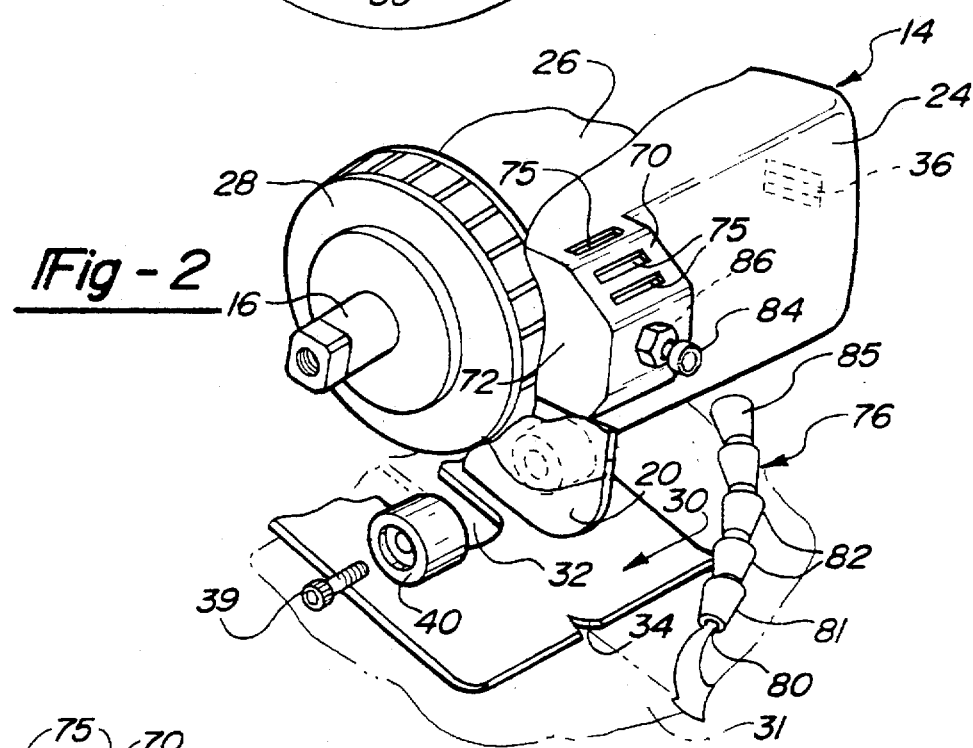
FIG. 2 is a fragmentary and exploded perspective view of the exhaust vent section and blower conduit attachments illustrated in FIG. 1.
Figure 3:
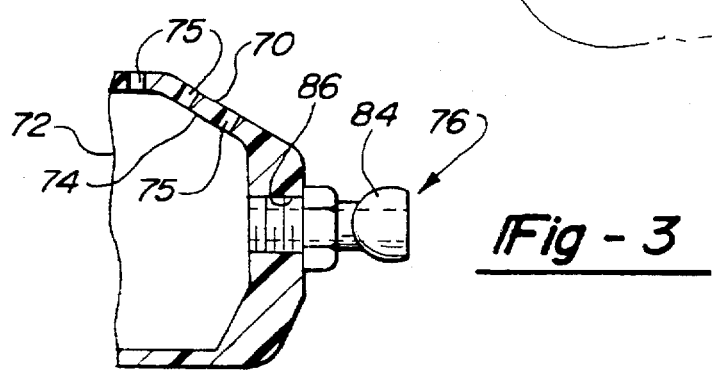
FIG. 3 is a partially segmented and side elevational view of the inlet funnel section of the circular saw housing shown in FIG. 2.

Referring now to the FIGS. 1-3 a circular saw 14 includes standard arbor 16, a saw blade 18, an upper blade guard housing 20, a pivotally mounted lower blade guard 22 and a motor housing 24 mounted adjacent the upper blade housing that houses a motor 26 and cooling fan 28. The housing 24, motor 26 and fan 28 are shown more clearly in FIG. 2. The arbor 16 is operably connected to the motor 26 for rapid rotation during operation of the motor.

A saw foot 30 with an aperture 32 therethrough is adjustably mounted for height and angularity with respect to the upper blade housing. The aperture 32 allows the blade 18 and lower guard housing 22 to extend downward therefrom. The platform 30 provides for stable positioning of the circular saw on flat wood pieces 31 during the cutting process. The front end of the platform 30 includes a lead guide 34 that can be a notch, colored line, etched surface or other suitable indicia.

The motor housing 24 includes inlet vents 36 and front exhaust funnel section 38 adjacent the upper blade housing. The pivoting lower blade guard 22 is abuttable against a stop member 40 that is affixed via bolt 39 to the upper blade housing 20. A handle 41 is affixedly mounted to the motor housing 24 and has a power switch 43 incorporated therein and a power cord 45 extending therefrom. The above described inlet vent, stop member, handle, power switch, and upper housing 20 apart from the exhaust vent section 38 are common and standard features of many direct drive circular saws and their specific structure will not be discussed further.

The motor housing 24 includes a funnel section 70 having an inlet end 72 adapted to receive air propelled from the cooling fan 28. The interior surfaces 74 funnel the air to and through an outlet 86 and into a flexible pipe nozzle 84. The nozzle 84 is connected to a conduit or pipe section 76 that may be a plurality of rigid links 82 pivoted together as in the commercially available Lock-Tite piping. The upstream link 85 is affixed to the nozzle 84 and the nozzle 84 in turn is rigidly affixed within outlet 86 of the funnel 70. The downstream end 81 of the pipe section 76 is open to form an outlet 80.

The flexible pipe section 76 is adjustable to bend under manual operation and bending by the operator but is stable once placed into position against the air flow pressures exiting the funnel section 70 and is also resistant to jostling and vibrations encountered by the circular saw during normal operation such that the end 81 is free standing without the support of clamps or brackets attached thereto or in proximity therewith. The outlet 80 is aimed toward the lead guide 34 as illustrated in FIG. 1 to continuously blow the saw dust from the lead guide and allow the lead guide to remain continuously visible during operation of the circular saw.

Optional exhaust vents 75 may extend through funnel section 70 to relieve back pressure and provide a sufficient amount of cooling air to flow by the motor 26 when in operation but still provide sufficient air flow to conduit 76 to blow the saw dust.

Variations and modifications are possible without departing from the scope and spirit of the present invention as defined by the appended claims.

The embodiments in which an exclusive property or privilege is claimed are defined as follows:

1. In a circular saw power tool having a blade protective housing, a lead guide mounted in front of said blade protective housing for resting on a piece of wood; a hub mounting adapted to mount a circular saw blade, a motor rotatably driving said hub mounting, a motor housing mounted about said motor, a cooling fan mounted to said motor within said motor housing for directing air about said motor and out through a vent nozzle in said motor housing; the improvement characterized by:

said vent nozzle constructed to mount a self supporting conduit that has a free standing distal end that directs air from the vent nozzle to the lead guide for blowing saw dust away from said lead guide when said motor is on and rotating said saw blade; and said vent nozzle connected to a funnel section that is integrally formed in said motor housing.

2. A circular saw power tool as defined in claim 1 further characterized by:

said conduit being constructed to be a self supportive flexible pipe that is adjustable and having a free standing distal outlet pointed toward said lead guide.

3. In a circular saw power tool having a blade protective housing, a lead guide mounted in front of said blade protective housing for resting on a piece of wood; a hub mounting adapted to mount a circular saw blade, a motor rotatably driving said hub mounting, a motor housing mounted about said motor, a cooling fan mounted to said motor within said motor housing for directing air about said motor and out through a vent nozzle in said motor housing; the improvement characterized by:

said vent nozzle constructed to mount a self supporting conduit that has a free standing distal end that directs air from the vent nozzle to the lead guide for blowing saw dust away from said lead guide when said motor is on and rotating said saw blade; and said funnel section having auxiliary exhaust vents extending therethrough sized to provide adequate air flow about said motor and also maintain adequate air flow through said vent nozzle and said conduit to blow saw dust from said lead guide.

4. In a circular saw power tool having a blade protective housing, a lead guide mounted in front of said blade protective housing for resting on a piece of wood; a hub mounting adapted to mount a circular saw blade, a motor rotatably driving said hub mounting, a motor housing mounted about said motor, a cooling fan mounted to said motor within said motor housing for directing air about said motor and out through a vent nozzle in said motor housing; the improvement characterized by:

said vent nozzle connected to a funnel section that is integrally formed in said motor housing.

* * * * *